United States Patent [19]

Tanaka et al.

[11] Patent Number: 5,635,804
[45] Date of Patent: Jun. 3, 1997

[54] POWER SUPPLY APPARATUS AND METHOD FOR AN ELECTRIC VEHICLE

[75] Inventors: Kunihiko Tanaka; Kaoru Hatanaka, both of Saitama, Japan

[73] Assignee: Honda Giken Kogyo Kabushiki Kaisha, Tokyo, Japan

[21] Appl. No.: 479,413

[22] Filed: Jun. 7, 1995

[30] Foreign Application Priority Data

Oct. 3, 1994 [JP] Japan ................................. 6-239000

[51] Int. Cl.$^6$ ........................................................ H02P 1/00
[52] U.S. Cl. ........................... 318/139; 318/432; 363/56; 323/908
[58] Field of Search ........................ 318/139, 798, 318/800, 799, 803, 804, 802, 254, 432; 361/100, 126, 31; 323/908; 363/49, 50, 51–58

[56] References Cited

U.S. PATENT DOCUMENTS

| | | | |
|---|---|---|---|
| 3,818,272 | 6/1974 | Rich | 307/66 |
| 3,935,527 | 1/1976 | Michelet et al. | 323/96 |
| 4,052,659 | 10/1977 | Fletcher et al. | 363/57 |
| 5,291,106 | 3/1994 | Murty et al. | 318/375 |

FOREIGN PATENT DOCUMENTS 61-280711  12/1986  Japan .

*Primary Examiner*—John W. Cabeca

[57] ABSTRACT

A field-effect transistor incorporates a diode which is disposed between a battery power source and an inverter. A rush-current suppressive starting circuit is provided in a stage anterior to the field-effect transistor. The transistor is shifted to its conducting state while the on-resistance of the transistor is gradually lowered to thereby limit a charging current to a power smoothing capacitor. In an off-state of a main switch, a charge stored in the current smoothing capacitor is released therefrom via a stabilized power circuit and a controller which is a power load to the circuit.

22 Claims, 9 Drawing Sheets

POWER SUPPLY APPARATUS AND METHOD FOR AN ELECTRIC VEHICLE

BACKGROUND OF THE INVENTION

1. Field of the Invention

The present invention relates to an electric vehicle power supply unit wherein DC power obtained from a battery power source is converted into AC power to power an electric motor that drives the vehicle. More particularly, the invention relates to a power supply unit that limits a rush current, which is caused when the DC power supply is switched-ON and DC power is supplied via an inverter to a motor, without the necessity of using a current limiting resistor. Further, the invention provides a simplified circuit configuration which permits an electric charge stored in the inverter's current smoothing capacitor to be discharged therefrom without the provision of a discharging circuit.

2. Description of Background Art

A power switching circuit contrived to prevent a rush current by the use of an electronic switch is proposed in Japanese Patent Laid-open No. Sho 61 (1986) 280711.

FIG. 7 is a circuit diagram showing the configuration of a conventional rush-current-preventing power switching circuit. According to the conventional circuit, when a switch 202 is closed, a capacitor 204 is gradually charged via a resistor 203 which causes NPN-type transistor 205 to be gradually placed in a conducting state. Subsequently, a PNP-type transistor 206, whose base current is controlled by the NPN-type transistor 205, is gradually placed in a conducting state. Consequently, a DC power source 207 and a load 208 (having a capacitive load) can be connected to each other without causing a rush-current.

FIG. 6 is a circuit block diagram of a known electric-vehicle power supply unit constituted by utilizing the conventional rush-current-preventing power switching circuit 201 shown in FIG. 7 and described above.

The electric-vehicle power supply unit 101 employs a PNP-type transistor 206 that is gradually placed in a conducting state in response to turn-ON of a main switch 102 as described above, whereby rush current flowing in inverter 103 and smoothing capacitor 104 is suppressed.

The electric charge stored in the current smoothing capacitor 104, however, cannot be discharged therefrom when the main switch 102 is in its OFF-state. Therefore, the prior art must provide a relay contact 105 which is placed in a conducting state in response to turn-OFF of the main switch 102 to discharge the energy stored in current smoothing capacitor 104 through the contact 105 and discharging resistor 106.

It is further necessary in the prior art to provide a diode 109 in parallel with the PNP-type transistor 206 in order to supply the regenerative power (which is generated at the time of regenerative braking of motor 107) to a battery power source 108 for absorption of such regenerative power.

Also in the conventional rush-current preventive power switching circuit 201, the PNP-type transistor 206 is kept completely in its OFF-state until the NPN-type transistor 205 is placed into operation by the charging of capacitor 204 such that the voltage thereof becomes higher than the threshold voltage between the base and the emitter of the NPN-type transistor 205. Accordingly, the actual supply of power from the DC power source to the load circuit 208 after closing of the front switch 202 is delayed. Consequently, the conventional circuit suffers from a time delay after turn-on of the main switch 102 which delays acceleration of the electric vehicle.

SUMMARY AND OBJECTS OF THE INVENTION

The present invention is directed to solving the problems mentioned above. A first object of the invention is to provide a simplified circuit configuration for an electric-vehicle power supply unit wherein an electric charge in a current smoothing capacitor can be discharged therefrom without the necessity of a discharge resistor or relay contact.

It is a second object of the present invention to reduce the number of required circuit components and to minimize packaging space by employing a power switching element with an incorporated power diode without using a separate power diode for absorption of power in the battery that is generated during regenerative braking.

A third object of the invention is to provide an electric-vehicle power supply unit that rapidly supplies power to the motor of an electric vehicle and wherein a current smoothing capacitor can be quickly charged immediately after the main switch is turned ON.

For the purpose of solving the problems mentioned above, the electric-vehicle power supply unit of the present invention employs a semiconductor power switching element disposed between a battery power source and an inverter that supplies electric power to a motor of an electric vehicle. Further, a rush-current suppressing circuit for controlling the semiconductor power switching element is provided in a stage preceding the switching element in such a manner as to shift the switching element to a conducting state while gradually lowering the on-resistance of the switching element. In addition, a stabilized power circuit for supplying a stabilized constant power to a controller for controlling the operation of the inverter is connected to a stage following the semiconductor power switching element and in parallel to positive and negative power terminals of the inverter, whereby the electric charge of a current smoothing capacitor (incorporated in the inverter) is discharged through the stabilized power circuit when the semiconductor power switching element is in its OFF-state.

In the power supply unit, the semiconductor power switching element may consist of a power field-effect transistor having a diode connected in parallel between a drain and a source thereof with reverse polarity, which permits power generated at the time of regenerative braking to be absorbed in the battery.

Preferably, the rush-current suppressing starting circuit is constructed to generate a predetermined driving energy amount at the time of power supply switch-ON and to progressively increase such driving energy with the lapse of time to thereby shift the semiconductor power switching element to a conducting state.

In the electric-vehicle power supply unit of the present invention, the rush-current suppressing starting circuit is provided in a stage preceding the semiconductor power switching element, and the switching element is so driven as to be shifted to its conducting state while the on-resistance thereof is gradually lowered, whereby the charging current to the current smoothing capacitor is limited by the on-resistance of the semiconductor power switching element at the time of power supply switch-ON. Consequently, excessive rush current at the power supply switch-ON time does not occur.

In addition, due to the provision of a stabilized power circuit in a stage following the semiconductor power switching element, the electric charge stored in the current smoothing capacitor of the inverter is discharged therefrom via the stabilized power circuit when the semiconductor power switching element is in its OFF-state. Thus, the charge can be dissipated from the current smoothing capacitor without the necessity of particularly providing a discharging circuit, to thereby simplify the circuit configuration.

Furthermore, because the semiconductor power switching element consists of a power field-effect transistor incorporating a diode connected in parallel between the drain and the source with reverse polarity, the power generated at the time of regenerative braking can be absorbed in the battery power source by utilizing such incorporated diode. Hence, the invention eliminates the necessity of a separate power diode and, consequently, reduces the number of required circuit components and the volume of packaging space for the circuit.

Furthermore, because the rush-current suppressing starting circuit generates a predetermined driving energy amount at the time of power switching-ON and increases the driving energy with a lapse of time to thereby shift the semiconductor power switching element to its conducting state, the current smoothing capacitor can begin to charge immediately after the power supply is switched ON. Therefore, even if the rise rate of the driving power is set to be low, the time delay from the power switching-ON point to the start of charging the current smoothing capacitor is reduced, thereby ensuring stable operation of the motor within a relatively shorter period of time than the conventional system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Hereinafter preferred embodiments of the present invention will be described with reference to the accompanying drawings.

Figure 1:
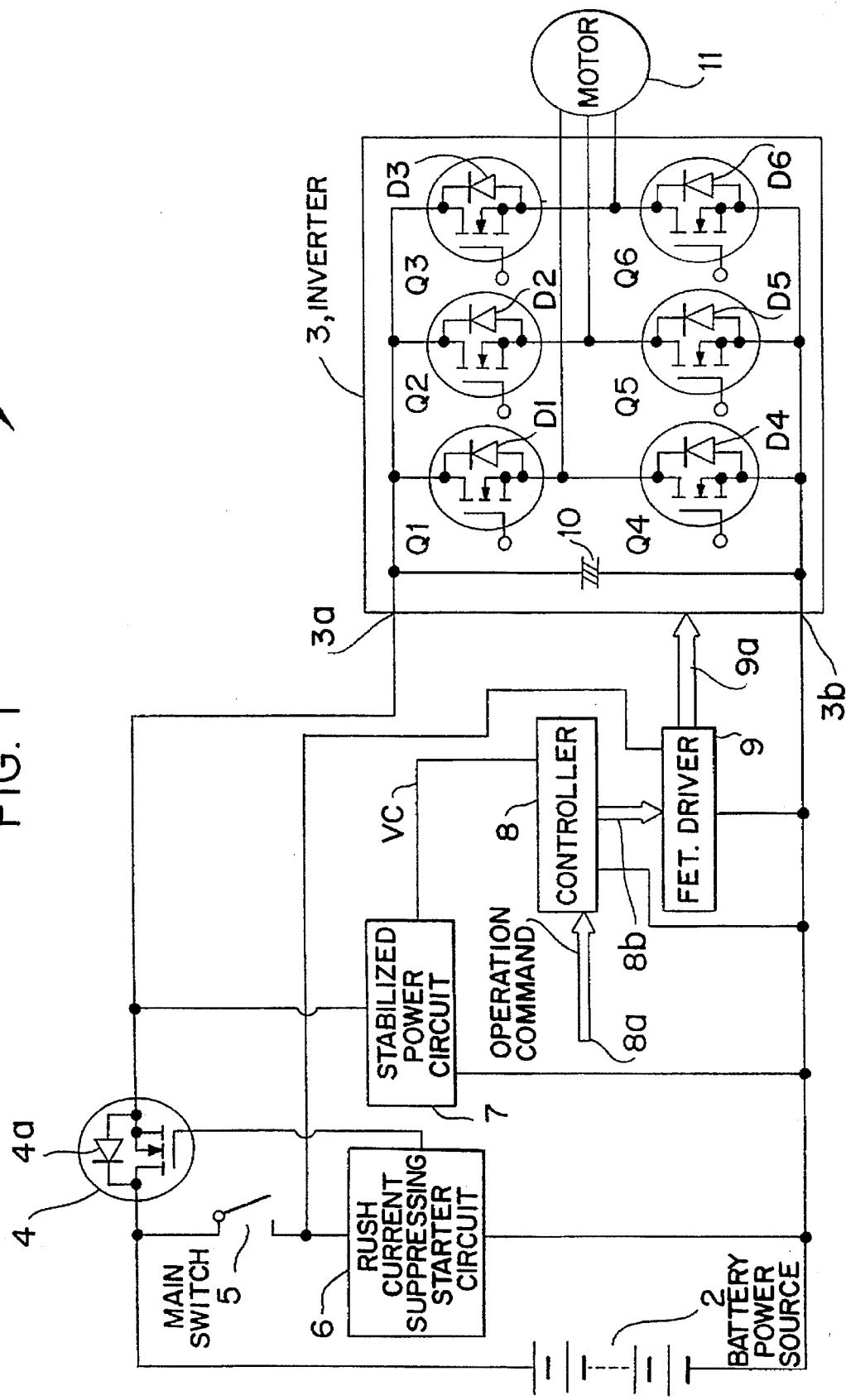
FIG. 1 is a circuit block diagram of an electric-vehicle power supply unit according to the present invention.

FIG. 1 is a circuit block diagram of the electric-vehicle power supply unit according to the present invention.

The electric-vehicle power supply unit 1 of the invention has a power field-effect transistor 4, which serves as a semiconductor power switching element, between the anode side of a battery power source 2 and an anode-side power input terminal 3a of an inverter 3. The field-effect transistor (FET) 4 employed here is equipped with a diode 4a incorporated therein. An anode of the diode 4a is connected to the drain side of FET 4, while a cathode thereof is connected to the source side of FET 4. In this embodiment, an enhancement type n-channel field-effect transistor such as an n-channel enhancement MOSFET may be used for FET 4.

A rush-current suppressing starting circuit 6 is disposed in stage preceding the field-effect transistor 4 via a main switch 5. When the main switch 5 is turned ON and power is supplied from the battery power source 2, the rush-current suppressing starting circuit 6 supplies voltage to the gate of the field-effect transistor 4 to thereby switch the transistor 4 to its conducting state. This circuit 6 is so formed as to gradually lower the ON-resistance of the field-effect transistor 4 by gradually increasing the voltage being supplied to the gate, hence causing a shift of the transistor 4 to its conducting state.

A stabilized power circuit 7 is disposed in a stage following the field-effect transistor 4. The stabilized power circuit 7 supplies a stabilized constant power VC to a controller 8, and comprises, for example, a step-down type three-terminal regulator circuit. For example, the stabilized power circuit 7 receives a supply voltage of 12 to 24 volts (or more) from the battery power source 2 and supplies a control voltage of, e.g., 5 volts to the controller 8.

The controller 8 comprises a microcomputer system. Controller 8b generates a PWM inverter-operation command output signal 8b in response to an operation command input 8a such as an acceleration command or a brake command fed from an operation console (not illustrated).

An FET driver 9 functions in response to the inverter-operation command output signal 8b obtained from the controller 8 and supplies switching voltages to the gates of each power field-effect transistors Q1–Q6 which constitute the inverter 3. For each of the power field-effect transistors Q1–Q6, it is necessary to supply a voltage, which is higher than the switching voltage from the controller 8, to the gate of each transistor Q1–Q6. For this purpose, the voltage of the battery power source 2 is supplied to the FET driver 9 via the main switch 5, and then the FET driver 9 produces a gate driving voltage signal 9a on the basis of the voltage obtained from the battery power source 2.

Owing to the above circuit configuration, the gate driving voltage signal 9a is never outputted in the OFF-state of the main switch 5, so that if an unrequired inverter-operation command signal 8b is outputted from the controller 8, the electric charge stored in the current smoothing capacitor 10 is discharged through the stabilized power circuit 7 and the controller 8 (a load to the stabilized power circuit 7), and the FET driver 9 is kept in its non-operating state. Thus, none of the power field-effect transistors Q1–Q6 in the inverter 3 is driven, and consequently, no power is supplied to the winding side of the motor 11.

Further, because the stabilized power circuit 7 is connected in parallel between the positive and negative power input terminals 3a and 3b of the inverter 3, the inverter 3 can be shunted with a relatively low impedance. Accordingly, it is possible to protect the field-effect transistors Q1–Q6 from electrostatic spikes.

The inverter 3 comprises six power field-effect transistors Q1–Q6 which are in a three-phase bridge connection, and a current smoothing capacitor 10 connected between the positive and negative power input terminals 3a and 3b. The power field-effect transistors Q1–Q6 respectively incorporate diodes D1–D6 which are connected in parallel between the drain and the source of each FET with reverse polarity.

The generated braking power (regenerative power) induced between the windings at the time of regenerative braking is supplied to the battery power source 2 via such incorporated diodes D1–D6 to the positive side of the battery power source 2 so as to be absorbed by the battery power source 2. Because the main switch 5 is not included in this regenerative current absorption path, even if an electric vehicle is hauled or towed while the main switch 5 is in an off-state, the regenerative power induced when the motor 11 is driven by an external force can be absorbed by the battery power source 2. Therefore, the voltage generated between the power input terminals 3a and 3b of the inverter 3 in the regenerative braking does not greatly exceed the supply voltage of the battery power source 3, so that the field-effect transistors Q1–Q6 and the current smoothing capacitor 10 employed herein may be of a relatively low withstand voltage type.

The electric-vehicle power supply unit 1 of the present invention is so constituted that the field-effect transistor 4 corresponding to a main power switch is shifted to its conducting state at a power supply switching-ON time while the ON-resistance thereof is gradually lowered by the rush-current suppressing starting circuit 6, wherein the charging current to the current smoothing capacitor 10 is limited by the ON-resistance of the field-effect transistor 4.

Consequently, it is possible to prevent a flow of any excessive charging current at the power supply switch-ON time. The field-effect transistor 4 employed in this embodiment is such that the allowable loss thereof is greater than the electric energy determined by the product of the ON-resistance and the charging current.

The field-effect transistor 4 is placed in a nonconducting state when the main switch 5 is turned OFF. However, since the stabilized power circuit 7 is connected in a stage following the field-effect transistor 4 and in parallel to the positive and negative power input terminals 3a and 3b of the inverter 3, the electric charge stored in the current smoothing capacitor 10 in the inverter 3 is discharged through the stabilized power circuit 7 and the controller 8 (a load to the stabilized power circuit 7). Consequently, the charge in the current smoothing capacitor 10 can be discharged therefrom without the necessity of providing a separate discharging circuit with a discharging resistor.

Further, due to the configuration where the field-effect transistor 4 has an incorporated diode 4a disposed between the battery power source 2 and the inverter 3, a separate power diode is not required for supplying regenerative power (which is induced at the time of regenerative braking) to the battery power source 2. Hence, this circuit configuration reduces the number of required component parts and the volume of packaging space for the circuit.

Figure 2:
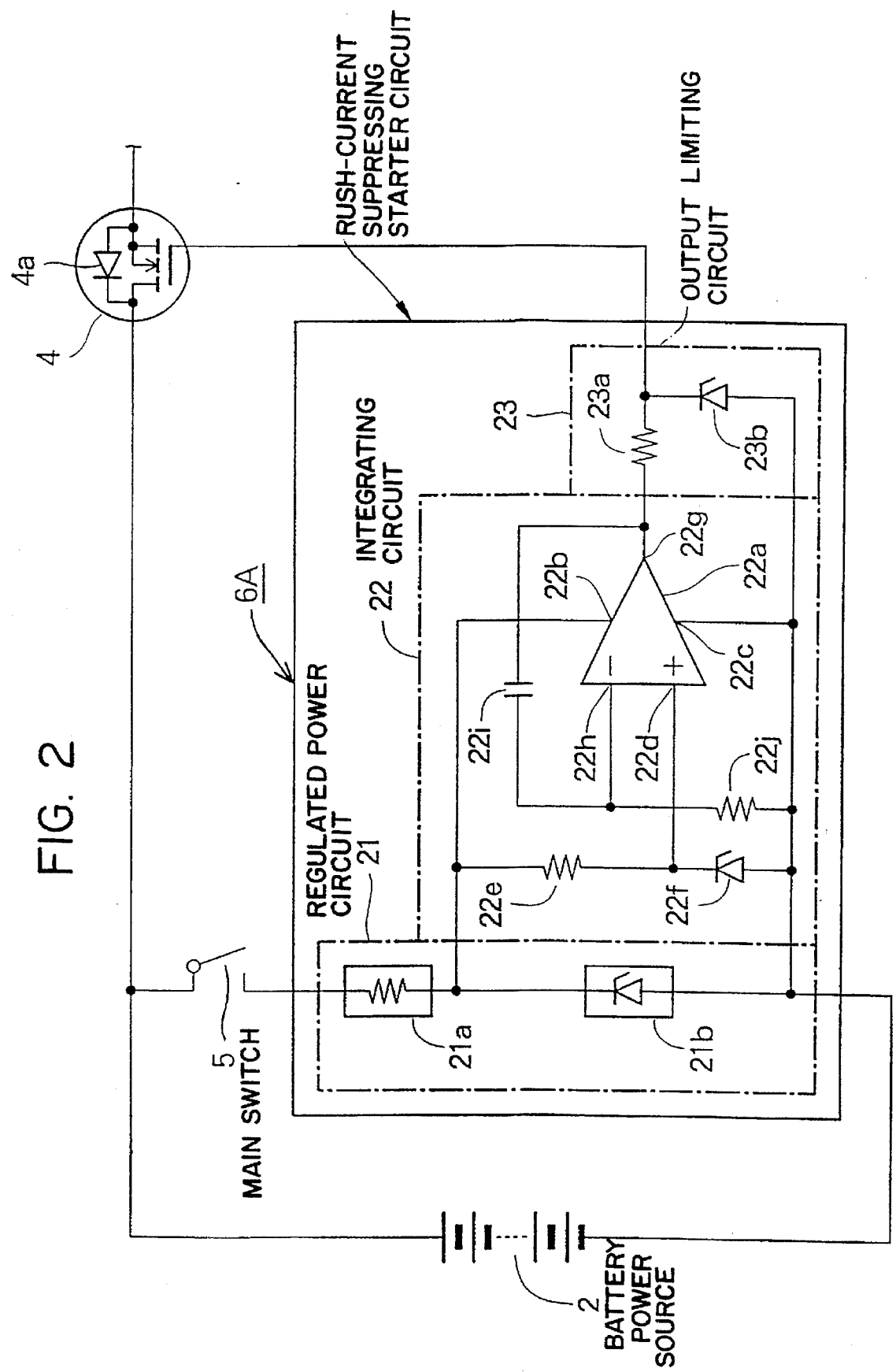
FIG. 2 is a circuit diagram showing an exemplary configuration of a rush-current suppressing starting circuit.

FIG. 2 is a circuit diagram showing an exemplary configuration of a rush-current suppressing starting circuit.

The rush-current suppressing starting circuit 6A shown in FIG. 2 includes, as principal components, an integrating circuit 22 using an operational amplifier 22, a power circuit 21, and an output limiting circuit 23.

The regulated power circuit 21 feeds electric energy to a constant voltage circuit 21b such as a voltage regulator diode, via an impedance element or an impedance circuit 21a such as a resistor or a constant current circuit, and then applies the output voltage of the constant voltage circuit 21b to positive and negative power terminals 22c and 22b, respectively, of the operational amplifier 22a in the integrating circuit 22.

A non-inverting input terminal 22d of the operational amplifier 22a is supplied with a bias voltage generated at the terminal of the voltage regulator diode 22f by feeding the power to the diode 22f via the resistor 22e. The circuit configuration may be so modified that the bias voltage can be obtained through a resistance-type voltage divider by the use of a resistor in place of the voltage regulator diode 22f.

An integrating capacitor 22i is connected between an output terminal 22g and an inverting input terminal 22h of the operational amplifier 22a, and an integral time-constant setting resistor 22j is connected between the inverting input terminal 22h and the negative side of battery power source 2.

The output limiting circuit 23 comprises a resistor 23a interposed between the output terminal 22g of the operational amplifier 22a and the gate of the field-effect transistor 4, and a voltage regulator diode 23b for limiting the maximum voltage supplied to the gate.

The operation of this rush-current suppressive starting circuit will be described below.

When the main switch 5 is turned on and a power is supplied from the battery power source 2 to the rush-current suppressing starting circuit 6A, regulated power is supplied from the power circuit 21 to the integrating circuit 22. Because the non-inverting input terminal 22d of the operational amplifier 22a is supplied with the bias voltage preset by the voltage regulator diode 22f, the initial output voltage corresponding to this bias voltage is delivered immediately after turn-ON of the main switch 5.

Thereafter, an integrating operation is performed with the time constant determined by the product of the capacitance value of the integrating capacitor 22i and the resistance value of the integral time-constant setting resistor 22j, whereby the output voltage of the operational amplifier 22a is raised in accordance with the integral time constant. When the output voltage of the operational amplifier 22a has reached the yield voltage of the voltage regulator diode 23b in the output limiting circuit 23, the voltage supplied to the gate of the field-effect transistor 4 is limited by the voltage regulator diode 23b.

Figure 3:
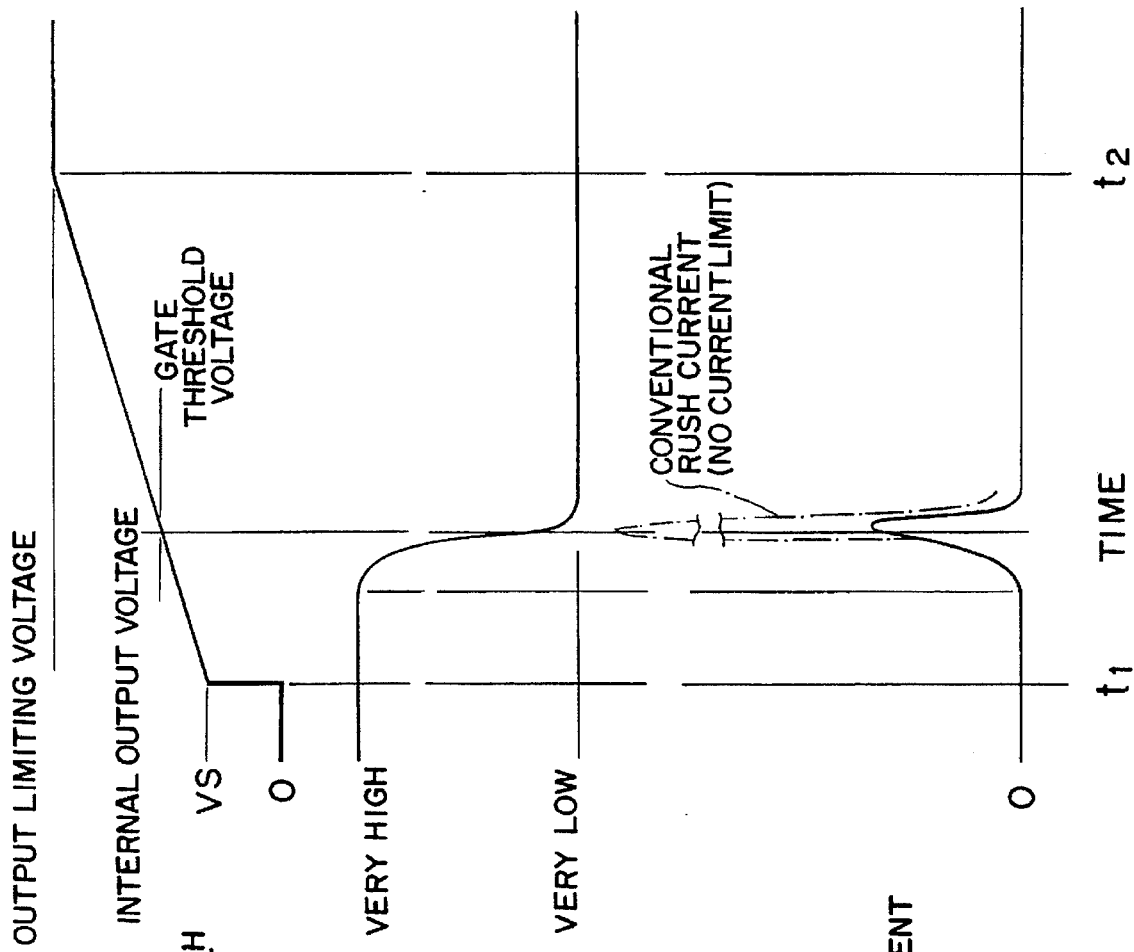
FIGS. 3a, 3b and 3c are time charts showing an output voltage of the rush-current suppressive starting circuit, the resistance of the field-effect transistor, and the rush current, respectively.

FIGS. 3(a), 3(b) and 3(c) are time charts showing the output voltage of the rush-current suppressing starting circuit and the operation of the field-effect transistor.

In response to turn-on of the main switch 5, as shown in FIG. 3(a), the rush-current suppressing starting circuit 6A generates an initial output voltage VS at a time t1 and thereafter raises the output voltage in accordance with a predetermined time constant. After time t2, the output voltage is maintained constant by the operation of the output limiting circuit 23. Since the gently rising voltage shown in FIG. 3(a) is supplied to the gate of the field-effect transistor 4, the ON-resistance of transistor 4 is gradually reduced in the vicinity of the gate threshold voltage as shown in FIG. 3(b). Consequently, the rush current to the capacitive load is limited by the ON-resistance of the field-effect transistor 4, so that the load current (drain current) ID is changed gently as shown in FIG. 3(c) while the maximum value of the rush current is decreased. Therefore the rush current can be suppressed effectively in comparison with the known current waveform in the conventional case where the rush current is not limited as denoted by a dashed line in FIG. 3(c).

The voltage supplied to the gate of field-effect transistor 4 needs to be raised gently. If the output of the rush-current suppressing starting circuit 6 is raised from 0 volts, there occurs a significant time delay until the field-effect transistor 4 is placed in its conducting state, so that immediate operation of the electric vehicle cannot be achieved. In this embodiment, an initial output voltage VS (a voltage slightly lower than the gate threshold voltage of the field-effect transistor 4) is generated at the time t1, and then the voltage supplied to the gate is gently raised after. Consequently, even if the rise rate of the gate voltage remains the same, it becomes possible to shorten the time period required starting from turn-ON of main switch 5 and until the field-effect transistor 4 is placed in its conducting state.

Figure 4:
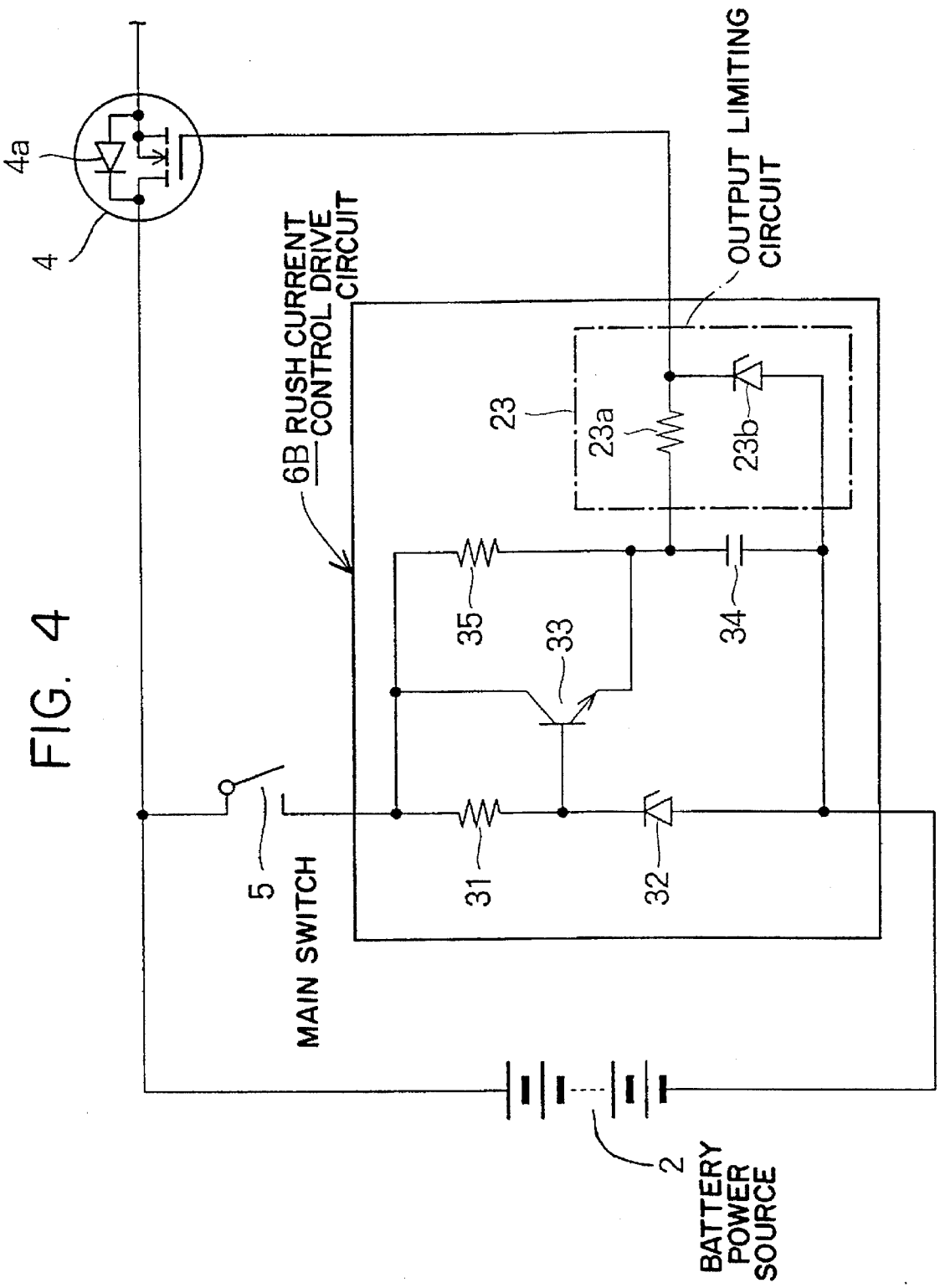
FIG. 4 is a circuit diagram showing another exemplary configuration of the rush-current suppressing starting circuit.

FIG. 4 is a circuit diagram showing another exemplary configuration of the rush-current suppressing starting circuit.

The rush-current suppressive starting circuit 6B shown in FIG. 4 is a combination of a fast-charging circuit using an NPN-type transistor and a time constant circuit consisting of a resistor and a capacitor.

In response to turn-on of a main switch 5, power is supplied to a voltage regulator diode 32 via a current limiting resistor 31. The output voltage generated from the voltage regulator diode 32 is supplied to the base of the NPN-type transistor 33, wherein a capacitor 34 connected to the emitter thereof is quickly charged by utilizing the current amplifying function of the NPN-type transistor 33 to thereby generate an initial output voltage VS across the capacitor 34. The voltage thus generated across the capacitor 34 is gradually raised by further charging the capacitor 34 via a charging resistor 35. The maximum value of the voltage supplied to the gate of FET 4 is limited by an output limiting circuit 23. Using this circuit arrangement, the output voltage (gate voltage) shown in FIG. 3(a) is generated.

Figure 5:
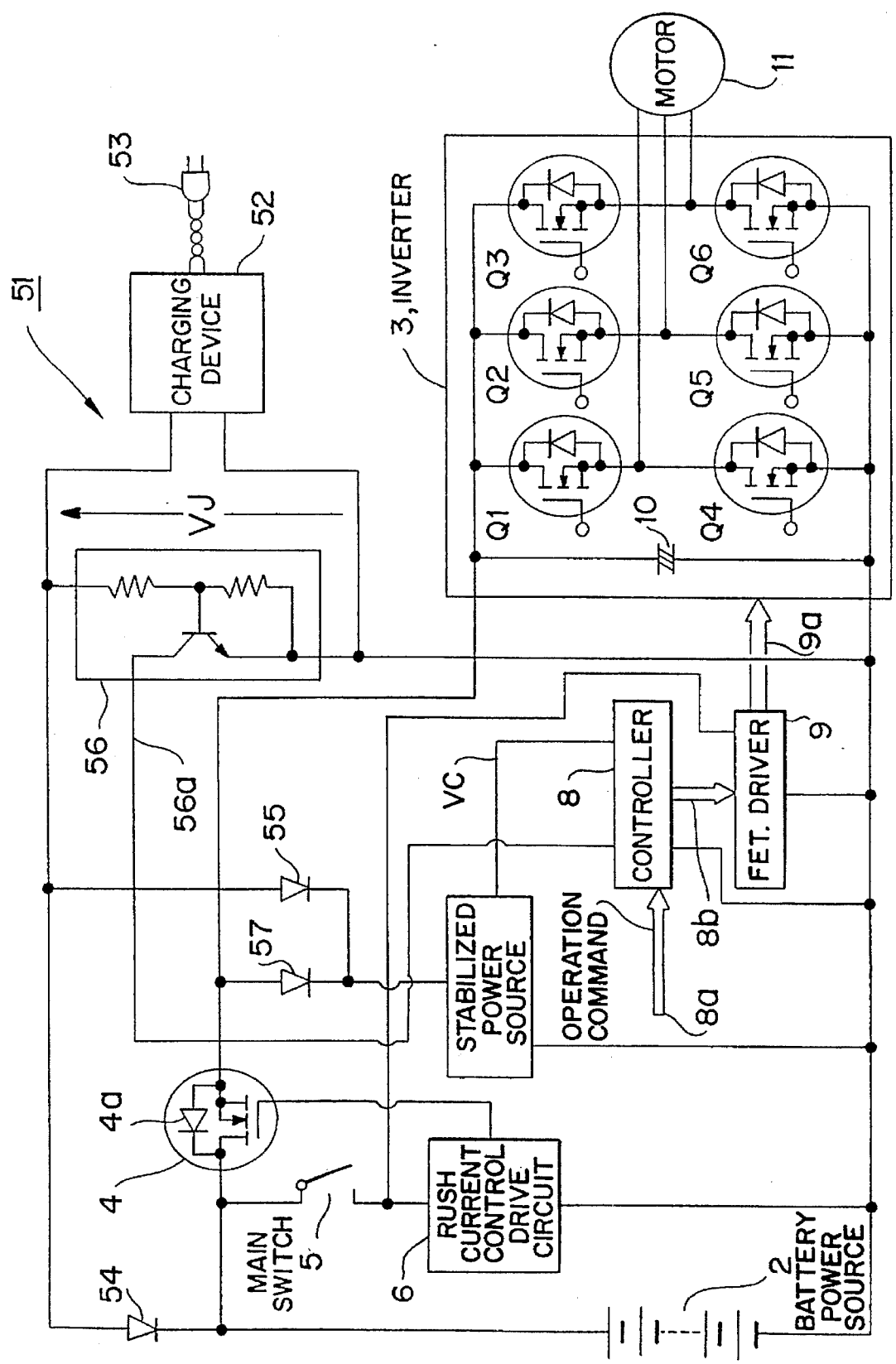
FIG. 5 is a circuit block diagram of another electric-vehicle power supply unit according to the present invention.
Figure 6:
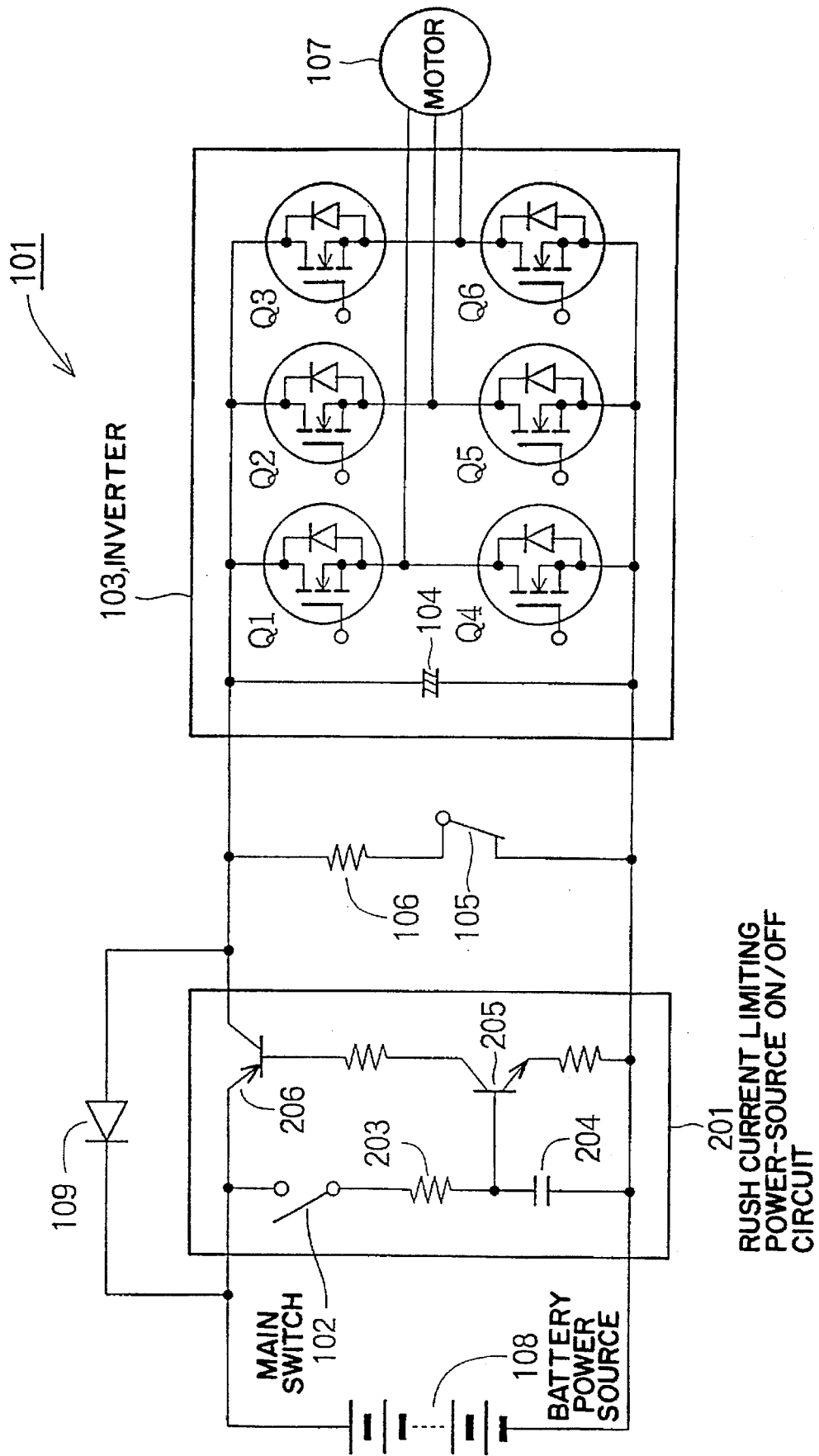
FIG. 6 is a circuit block diagram of a known electric-vehicle power supply unit using a conventional rush-current preventing power switching circuit.
Figure 7:
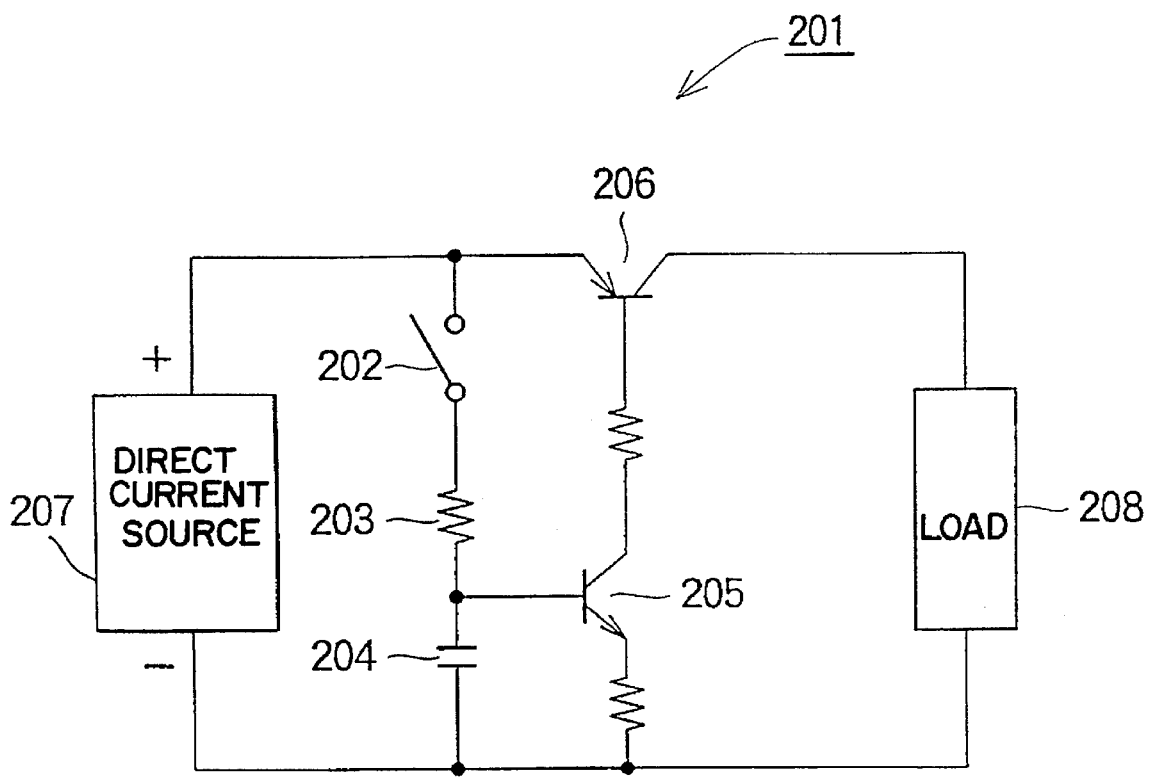
FIG. 7 is a circuit diagram showing the configuration of the conventional rush-current preventing power switching circuit.

FIG. 5 is a circuit block diagram of an electric-vehicle power supply unit equipped with a charging function.

The electric-vehicle power supply unit 51 shown in FIG. 5 is equipped with a charger 52. Charger 52 outputs a charging voltage VJ by converting commercial AC power into DC power. Thus, a battery power source 2 for powering the electric vehicle can be charged by connecting an AC plug 53 to an AC outlet socket to supply AC power to the charger 52.

The charging voltage VJ is supplied to the battery power source 2 via a reverse-current preventing diode 54 to thereby charge the battery power source 2. Further, the charging voltage VJ is also supplied to a stabilized power circuit 7 via a diode 55. Controller 8 is supplied with DC power and kept in operation even during the charging state and, for example, an L (low) level signal 56a indicating such charging state is supplied to the controller 8 by an interface circuit 56 which includes an NPN-type transistor. When the controller 8 has detected the charging state in response to, e.g., the L-level signal indicative of the charging state, the controller 8 halts generation and output of an inverter operation command signal 8b.

A diode 57 provided on the input side of the stabilized power circuit 7 prevents the charging voltage VJ outputted from the charger 9 being supplied to the inverter 3.

Figure 8:
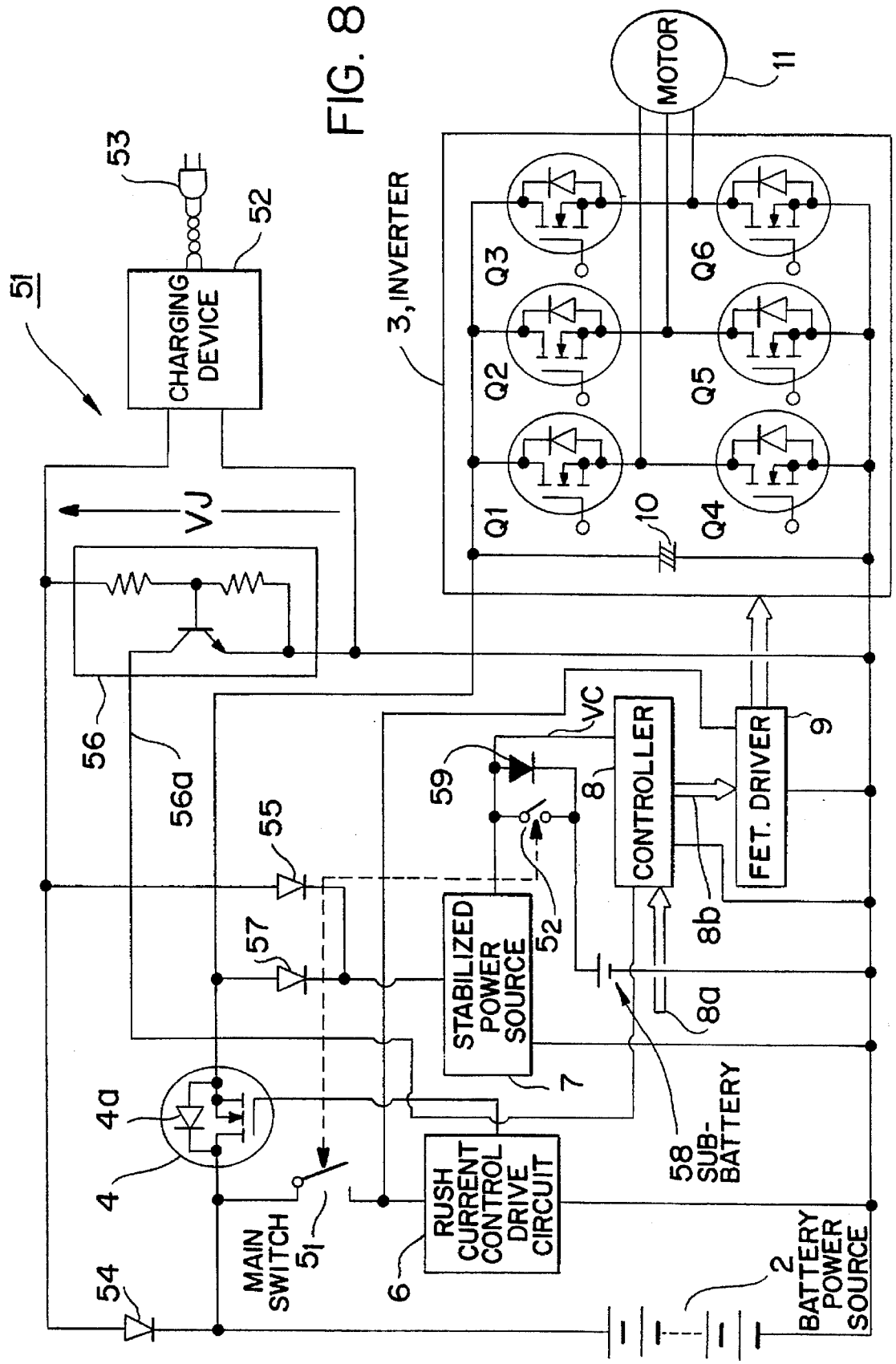
FIG. 8 is a circuit block diagram of another electric-vehicle power supply unit having a sub-battery according to the present invention.

The configuration of FIG. 8 employs the same configuration as in FIG. 5, but also includes sub-battery 58 connected to the power VC line through a parallel connection of a diode 59 and a switch $5_2$. When the charging voltage VJ is supplied to the stabilized power circuit 7 during the charging time, the sub-battery 58 or other suitable energy storage device that is connected to the power VC line through diode 59, can be charged in addition to battery 2. When main switch $5_1$ closes, switch $5_2$ closes to permit sub-battery to supply voltage to controller 8.

Figure 9:
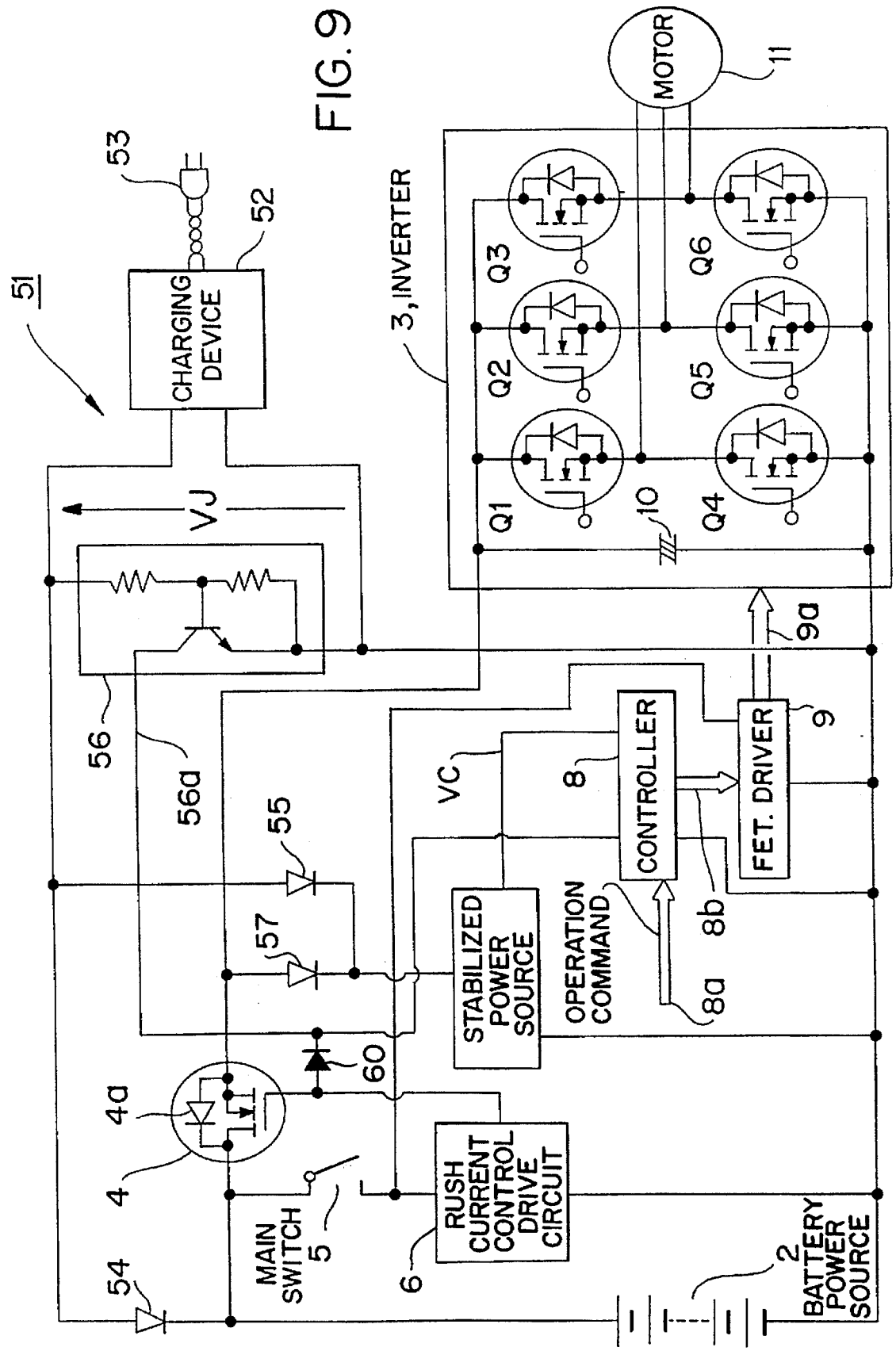
FIG. 9 is a circuit block diagram of another electric-vehicle power supply unit according to the present invention.

The embodiment shown in FIG. 5 may be modified as shown in FIG. 9 such that instead of the feed to the stabilized power circuit 7 at the charging time, the gate of the field-effect transistor 4 is held at the ground potential by connecting the gate of FET 4 to the NPN-type transistor in the interface circuit 56 for example, whereby the power supply to the inverter 3 can be blocked despite turn-on of the main switch 5.

In the electric-vehicle power supply unit of the present invention, as described hereinabove, a rush-current suppressing starting circuit is provided in a stage preceding the semiconductor power switching element, and this switching element is driven in such a manner as to be shifted to its conducting state while the ON-resistance thereof is gradually lowered. Consequently, when the power supply is switched ON, the charging current to a current smoothing capacitor is limited by the ON-resistance of the semiconductor power switching element, whereby the flow of excessive rush-current is prevented at the power supply switching-ON time.

In addition, due to the provision of a stabilized power circuit in a stage following the semiconductor power switching element, the electric charge stored in the current smoothing capacitor in the inverter is discharged therefrom through the stabilized power circuit during the OFF-state of the semiconductor power switching element. Thus, it becomes possible to dissipate the charge from the current smoothing capacitor without providing any particular discharging circuit, hence, simplifying the circuit configuration.

Furthermore, because the semiconductor power switching element consists of a power field-effect transistor incorporating a diode connected in parallel between the drain and the source with reverse polarity, the power generated during regenerative braking can be absorbed in the battery power source by utilizing such incorporated diode. This arrangement eliminates the necessity of a separate power diode and, consequently, reduces the number of required circuit components and the volume of packaging space for the circuit.

Furthermore, because the rush-current suppressing starting circuit generates a predetermined driving energy amount at the power switching-ON time and then increases the driving energy amount over time to thereby shift the semiconductor power switching element to its conducting state, the power smoothing capacitor starts charging immediately after the power is switched ON. Therefore, even if the rise rate of the driving power is set to be low, the time delay from the power switching-on point to the start of charging the power smoothing capacitor is reduced. By using this invention, stable motor operation of the electric vehicle is ensured within a relatively short time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply unit for a motor of an electric vehicle, wherein a semiconductor power switching element is disposed between a battery power source and an inverter for supplying electric power to the motor;
   a rush-current suppressing starting circuit provided in a stage following said semiconductor power switching element driving said semiconductor power switching element to shift said semiconductor switching element to its ON-state while gradually lowering the ON-resistance of said semiconductor switching element; and
   a stabilized power circuit for supplying a stabilized constant power to an inverter controller connected to a stage following said semiconductor power switching element in parallel to positive and negative terminals of said inverter, whereby the electric charge of a current smoothing capacitor is discharged therefrom via said stabilized power circuit when said semiconductor power switching element is in its OFF-state.

2. A power supply unit for an electric vehicle according to claim 1, wherein said semiconductor power switching element comprises a field-effect transistor having a diode connected in parallel between a drain and a source of the field-effect transistor with reverse polarity whereby regenerative power generated during is absorbed in said battery power source by channelling the regenerative power through said diode.

3. A power supply unit for an electric vehicle according to claim 1, wherein said rush-current suppressive starting circuit generates a predetermined driving energy amount at the time of power supply switching-ON and progressively increases the driving energy with the lapse of time to thereby shift said semiconductor power switching element to a conducting state.

4. A power supply for supplying power to a motor of a vehicle comprising:
   a DC power source,
   a main switch connected to said DC power source,
   a power converter converting DC power to AC power and supplying the converted AC power to the motor,
   a semiconductor switch element interposed between said main switch and said power converter,
   a rush current suppressing circuit suppressing a rush current to the inverter when the main switch is switched ON by shifting said semiconductor switch element to a conducting state and gradually lowering the ON-resistance of said semiconductor switching element, and
   a constant voltage source supplying constant voltage to a control terminal of said semiconductor switch element in response to switch-ON of said main switch to shift said semiconductor switch element into a conducting state.

5. The power supply of claim 4 further comprising:
   a stabilized power circuit connected across input terminals of said inverter and proceeding said semiconductor switch element supplying stabilized power to a controller wherein said controller controls the output of said power converter.

6. The power supply of claim 5 wherein said power converter comprises field-effect transistors and a current smoothing capacitor connected across the input terminals of said power converter and wherein said stabilized power circuit and said controller comprise a discharge circuit for said current smoothing capacitor when said main switch is switched OFF.

7. The power supply of claim 5 wherein said power converter comprises field-effect transistors and wherein said controller outputs a command output signal to an FET driver which produces gate driving voltages that control the output of said power converter.

8. The power supply of claim 4 wherein said power converter and said semiconductor switch element comprise field-effect transistors having diodes connected in parallel between the drain and source of each FET with reverse polarity wherein said diodes channel regenerative braking power from the motor to said DC power source.

9. The power supply of claim 4 wherein said semiconductor switch element comprises a field-effect transistor and wherein the control terminal which is supplied constant voltage by said constant voltage source in response to switch-ON of said main switch is a gate of said field-effect transistor.

10. The power supply of claim 4 wherein said DC power source is a battery and further comprising:
    a charging device charging said battery.

11. The power supply of claim 10 further comprising a reverse current preventing diode interposed between said charging device and said battery.

12. The power supply of claim 5 wherein said DC power source is a battery and further comprising:
    a charging device charging said battery and
    a charging state indicating circuit supplying a charging state indication signal to said controller when said charging device is charging said battery wherein said controller stops said power converter from supplying converted power to the motor upon receipt of the charging state indicating signal.

13. The power supply of claim 10 further comprising a reverse current preventing diodes interposed between said charging device and said stabilized power circuit and between said main switch and said stabilized power circuit.

14. The power supply of claim 10 further comprising a sub-battery interposed between said stabilized power source and said controller receiving charging voltage from said charging device.

15. A power supply for supplying power to a motor of a vehicle comprising:
    a DC power source;
    a main switch connected to said DC power source;
    a power converter converting DC power to AC power and supplying the converted AC power to the motor;
    a semiconductor switch element interposed between said main switch and said power converter; and
    a rush current suppressing circuit suppressing a rush current to the inverter when the main switch is switched ON by shifting said semiconductor switch element to a conducting state and gradually lowering the ON-resistance of said semiconductor switch element, said rush current suppressing circuit further including
    a quick-charging circuit, responsive to a switch-ON of said main switch, for quickly charging a capacitor to an initial output voltage that is supplied to a control terminal of said semiconductor switch element wherein the initial output voltage shifts said semiconductor switch element into a conducting state.

16. The power supply of claim 9 wherein said rush current suppressing circuit further comprises:

an integrating circuit integrating the voltage from said constant voltage source according to a time-constant and supplying the integrated voltage to a gate of said field effect transistor of said semiconductor switch element to thereby gradually lower the ON-resistance of said field-effect transistor.

17. The power supply of claim 16 wherein said integrating circuit further comprises an operational amplifier.

18. The power supply of claim 16 wherein said rush current suppressing circuit further comprises an output limiting circuit limiting the voltage supplied to the base of the field-effect transistor of the semiconductor switch element.

19. The power supply of claim 15 wherein said semiconductor switch element comprises a field-effect transistor and wherein the control terminal which is supplied the initial output voltage from the capacitor of said quick-charging circuit is a gate of said field-effect transistor.

20. The power supply of claim 19 wherein said rush current suppressing circuit further comprises:

a gradual-charging circuit responsive to switch-ON of said main switch gradually charging the capacitor with a supplemental charging voltage that is supplied to the base of the field effect transistor of said semiconductor switch element to thereby gradually lower the ON-resistance of said field-effect transistor.

21. The power supply of claim 20 wherein said rush current suppressing circuit further comprises an output limiting circuit limiting the voltage supplied to the base of the field-effect transistor of said semiconductor switch element.

22. A method for preventing rush-current to a motor of an electric vehicle that occurs during switch-ON of the motor comprising the steps of:

supplying stabilized DC power to an AC power controller with a stabilized power circuit, supplying DC power to a main switch, turning the main switch ON, shifting a second switch into a conducting state in response to switch-ON of the main switch to supply DC power from the main switch to a power converter, smoothing the DC power supplied to the power converter with a current smoothing capacitor, gradually lowering the ON-resistance of the second switch, converting the DC power from the second switch to AC power with the power converter, controlling said converting step with the AC power controller, supplying the controlled AC power to the motor, and discharging a charge stored on the current smoothing capacitor through the stabilized power circuit when the main switch is turned OFF.

* * * * *